United States Patent [19]

Lyonnet

[11] 4,369,562

[45] Jan. 25, 1983

[54] PROCESS FOR THE MANUFACTURE OF A PROFILE FOR METAL JOINERY HAVING A THERMAL GAP

[75] Inventor: Christian Lyonnet, Fontenay sous Bois, France

[73] Assignee: Societe de vente de L'Aluminium Pechniney, Paris, France

[21] Appl. No.: 894,028

[22] Filed: Apr. 6, 1978

[30] Foreign Application Priority Data

May 11, 1977 [FR] France ............................. 77 15182

[51] Int. Cl.³ .......................................... B22D 11/126
[52] U.S. Cl. .................................. 29/527.1; 264/46.7; 264/46.5
[58] Field of Search .................... 264/46.7, 46.5, 46.4; 29/527.1, 527.2, 527.3, 517, 400 C, 530, 156.6

[56] References Cited

U.S. PATENT DOCUMENTS

| Re. 27,593 | 3/1973 | Gondeck et al. ................. 264/45 X |
| 3,119,129 | 1/1964 | Evans et al. ................... 264/46.5 X |
| 3,411,254 | 11/1968 | Kessler ............................... 264/46.5 |
| 3,759,479 | 9/1973 | Howell et al. ......................... 249/95 |
| 4,059,564 | 11/1977 | Coughlan ........................... 264/46.4 |

FOREIGN PATENT DOCUMENTS 2358637 5/1975 Fed. Rep. of Germany .
2081854 10/1971 France .

Primary Examiner—Francis S. Husar
Assistant Examiner—V. K. Rising
Attorney, Agent, or Firm—McDougall, Hersh & Scott

[57] ABSTRACT

A method that relates to the manufacture of composite profiles made of metal and plastic, in which suitably shaped thin metal profiles are applied against the internal surface of a rigid mold and injecting a foamed plastic between the two profiles, the tightness between the two profiles being provided by an elastomer jointing.

9 Claims, 5 Drawing Figures

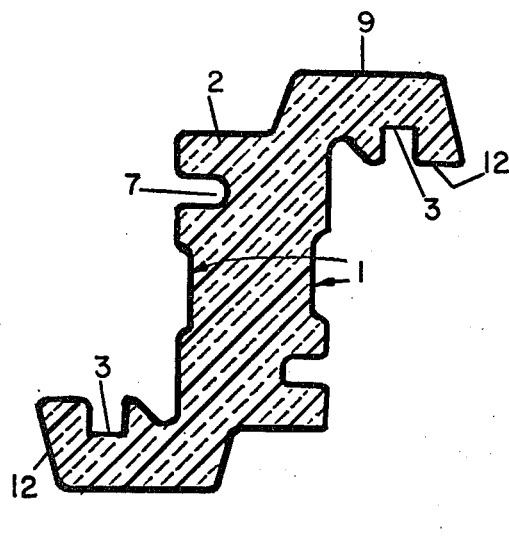
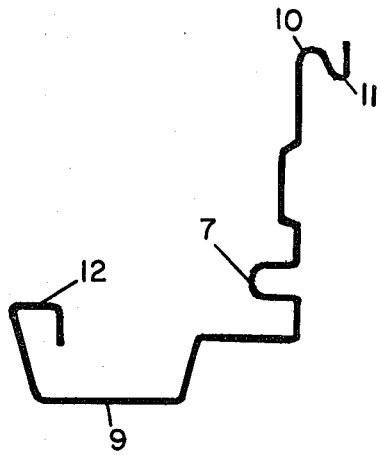
FIG. 1
FIG. 2
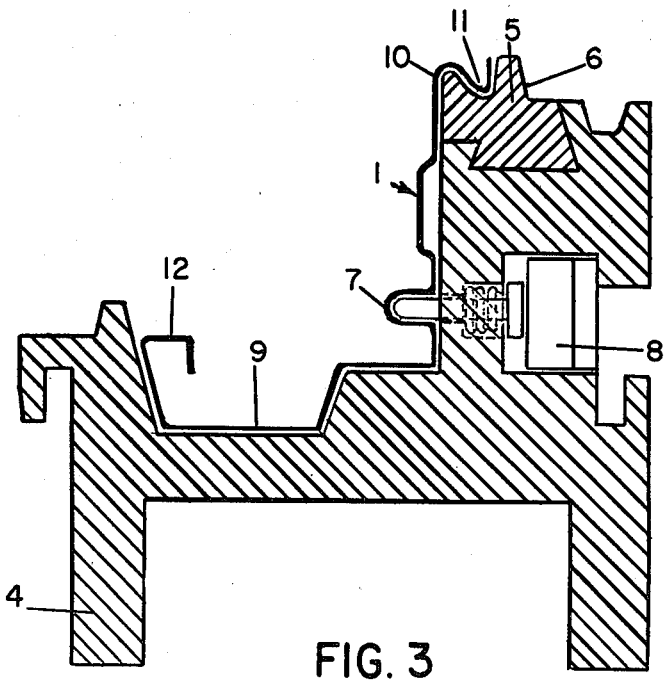
FIG. 3

PROCESS FOR THE MANUFACTURE OF A PROFILE FOR METAL JOINERY HAVING A THERMAL GAP

The invention relates to a new process for producing a composite profile for producing jointing having a thermal gap.

The progress in the art, the search for comfort and the savings in heat have brought about a marked development in metal joinery, and then in joinery having a thermal gap. Metal joinery has the advantages over traditional wooden joinery of greater strength, imputrescibility, indeformability in humidity and the case of mass production.

However, it was soon discovered that the high coefficient of thermal exchange or cnductivity of metal impaired thermal insulation of the building and caused condensation which was harmful to the interior of premises. Various composite joinery devices having a so-called "thermal gap" have been produced to overcome these disadvantages. Such composite joinery improves not only the thermal insulation but also the sound-proofing of buildings.

Certain devices, such as the one described in French Pat. No. 1,138,912, make use of two metal semi-profiles in which recesses have been left for the introduction of two ribbons composed of insulating material which, once installed, connect the two metal semi-profiles, forming a tube in which an expanding and polymerizable insulating material is injected. Owing to its expanding action, this insulating material blocks the ribbons composed of insulating material in their recess, making the assembly compact and integral. The two ribbons, composed of insulating material, have to be sufficiently strong and are thus composed of dense plastic to resist by themselves the pressure of the expanding material, as it is injected.

Other devices make use of a technique in which two metal semi-profiles are joined by means of a rigid cord composed of insulating material which is slid into the recesses having shapes which are complementary to that of the insulating cord. The cross-sections of the recesses are greater than those of the insulating cord so as to make it easier to slide the cord over the length of the metal semi-profiles. After sliding the jointing into place, the recesses in the metal semi-profiles are deformed in order to block the assembly.

The plastic cord must be of sufficient mechanical strength to provide a bond between the metal semi-profiles. It is consequently composed of dense plastic and is thus relatively expansive and a conductor of heat. The task of installing the jointing is relatively lengthy and arduous. In spite of all the precautions taken, the mechanical bond between the two metal semi-profiles is poor. Each semi-profile has to resist the mechanical stress individually and has to be dimensioned accordingly. Owing to this fact, the semi-profiles themselves are heavy and burdensome.

Other devices make use of a well known principle known as "foaming." It involves injecting into a tubular metal profile a polymerizable material, preferably a foaming material, which fills the tube formed by the metal profile, then removing a section of several millimeters from the two parallel frontages connecting an external face and an internal face, so as to create the thermal gap. The injected material, remaining after this operation, produces the bond between the two metal semi-profiles obtained by this machining operation. Such a production process is described in French Pat. No. 2,100,177. Here again the original hollow walls of the profile have to be sufficiently thick to resist by themselves the pressure of the plastic at the time of foaming. The operation of machining the hollow profile on two faces is relatively awkward and arduous. It involves a loss of metal.

Profiles composed completely of plastic have also been produced as described, for example, in German utility model GBM No. 1,995,167. These profiles are composed of high density plastic so as to have sufficient mechanical strength. They are, however, too brittle, particularly in corners and are difficult to repair.

Profiles composed of dense plastic and covered with 0.2 to 0.3 mm aluminum foil to improve the appearance have also been proposed. This thin aluminum foil hardly contributes to the mechanical strength of the profiles.

It would be desirable to find composite profiles combining all the mechanical and thermal properties of metals and low density plastics. The surface where the maximum mechanical stresses are exerted, such as impact stresses and tensile and compressive stresses, must be composed of a metal thicker than 0.5 mm. The interior of the profile, where the amount of work is reduced, may be made of low density plastic, preferably of foamed plastic having a density of 80 to 250 kg per $m^3$ and, preferably, 100 to 200 kg per $m^3$. The adhesion between metal and plastic must be excellent so as to insure perfect cooperation and to benefit from the mechanical properties of each element, in particular to benefit fully from a moment of inertia caused by the metal elements arranged on the two opposing faces and from the excellent thermal and sound insulation of plastics, especially plastics in the foamed state. Metal semi-profiles between about 0.5 and 1 mm thick combined with a rigid core composed of low density plastic could then be used. The assembly forms a complex functioning like a sandwich.

The process forming the subject of the invention allows composite profiles of this type to be produced economically.

This process involves, in the first place, using a rigid mold made up of two shells on the internal surface of which is applied each of the metal profiles, the longitudinal edges being temporarily separated by elastomer jointing integral with the mold and pressed between the metal edges. The rigid mold will hereinafter be referred to as "conformator". The metal profiles have a cross-section, preferably of the general shape of an L, the upper end of which is bent to the exterior in the opposite direction to the small branch of the L along an N section forming a rib followed by an axial groove substantially parallel to the large branch of the L. When each metal profile is positioned in the corresponding shell of the conformator, the base of the L is applied to the corresponding surface of the conformator. As a result, the groove at the end of the large branch of the L engaged in a corresponding groove in the conformator, or, preferably, in a groove in the elastomer jointing.

The metal profiles forming the surface of the composite profile are preferably aluminum profiles, 0.5 to 1 mm thick, obtained from sheet metal which may have received a surface treatment such as painting or anodization prior to shaping.

The invention will hereinafter be described with reference to the following drawings which are given by way of illustration and not by way of limitation, in which:

FIG. 1 is a cross-section of a composite profile obtained by the process;

FIG. 2 is an elevational view of an elementary metal profile forming the surface of the composite profile;

FIG. 3 is a cross-sectional view of a metal profile arranged in the corresponding semi-conformator;

Figure 4:
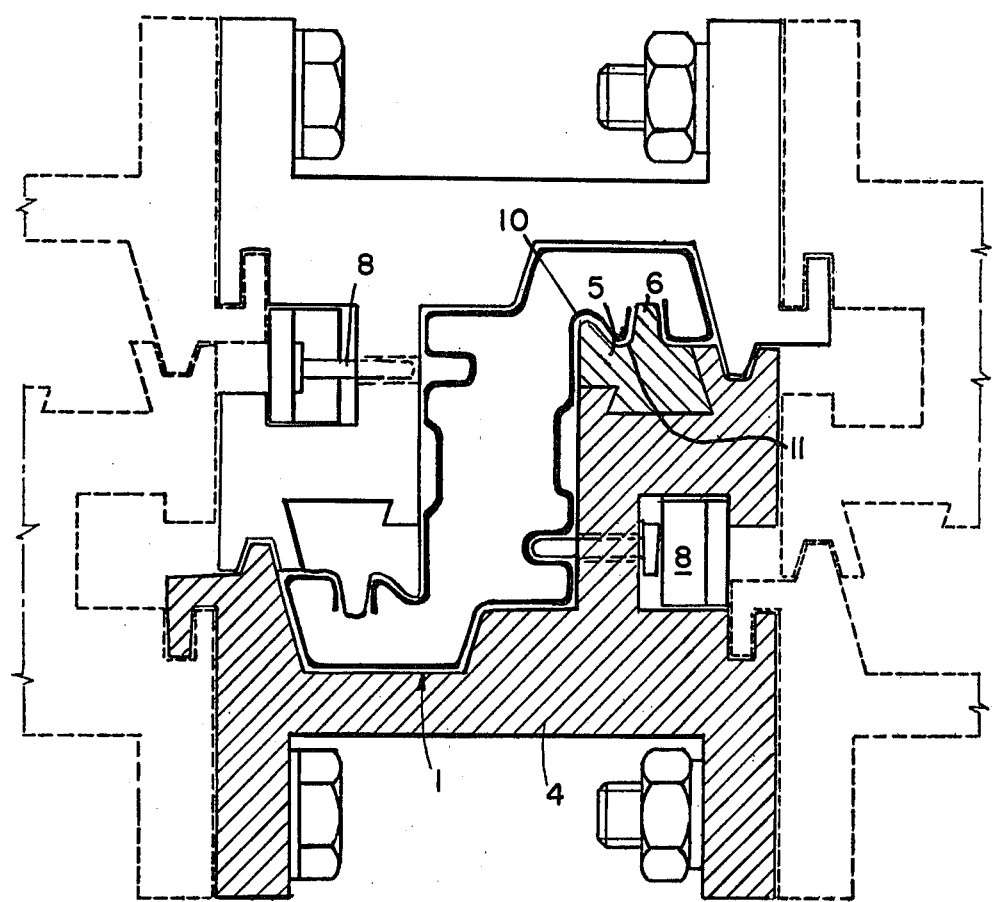
FIG. 4 is a cross-section of the composite profile in its conformator at the time of injection of the plastic foam.

FIG. 1 shows a composite profile according to the invention. This profile is formed by assembling two identical metal profiles 1, having a general shape of an L, made of 0.7 mm thick aluminum, forming the surface of the composite profile, and of a core 2 formed by a plastic foam having a density of 120 kg per m³ which fills the space between the two metal profiles and insures that they are perfectly bonded. This perfect bond is essential to insure the cooperation of the metal profiles 1 of high mechanical strength and the insulating core 2. The profiles 1 shown here are profiles shaped in a rolling mill from an aluminum sheet. The two intervals or recesses 3 between the two metal profiles, forming a double solution of continuity in the metal surface of the composite profile, are noted. These intervals form the desired thermal gaps.

The problem encounted in the production of such a composite profile is that thin metal profiles 1, taken individually, are flexible and deformable both in a lengthwise and transverse direction. In addition, use is made of a low density foam obtained from a mixture of plastic and expander, that is to say, a product liberating a large quantity of gas. This gas, at the moment when it is generated and before the plastic solidifies, exerts a pressure which may be as much as 300,000 effective pascals between the two metal profiles.

It may be imagined that metal profiles less than 1 mm thick cannot tolerate such pressures without becoming deformed. They are kept firm by being applied to the internal walls of a rigid mold or "conformator" composed of two symmetrical shells 4. The walls of the conformator provide a composite profile having exact dimensions, conforming to the standards imposing tolerances of the order of one-tenth of a millimeter.

How should an interval 3 of the order of 5 to 6 mm between the two metal profiles 1, as required for the thermal gap, be maintained without the foam overflowing and infiltrating between the metal profile 1 and the wall of the conformator 4 either prior to expansion in the liquid state or under pressure during expansion? The desired result has been obtained by means of jointing 5 composed of silicone. The silicone does not adhere to the foam. It has the property of elastomers of being able to deform elastically under pressure but almost without contraction in volume. The end 6 of this jointing 5, separating the two metal profiles 1, has a trapezoidal cross-section narrowing towards the end so that it may be inserted in a corner between the two edges of the two profiles 1 and provide a good seal even under a pressure of of 300,000 pascals.

In addition, it is possible to mold the composite profile and remove it from the mold rapidly and to hold the metal semi-profiles on the internal faces of the two shells 4 with precision.

A longitudinal groove 7 having a width of 4 mm is provided for this purpose in the metal profiles 1 along the large side of the L. Detachable fingers 8, which are integral with the conformator and penetrate this groove, block the profiles in the corresponding shell 4. The end of the small edge 9 rises so that it can fit and be blocked in a corresponding concave part of the shell 4. The large branch of the L-shaped section of each metal profile ends with an edge turned in the direction opposite to the side at the base of the L. This N-shaped edge forms a rib 10 followed by a groove 11 which corresponds to a groove at the base of the end 6 of the silicone jointing 5, the groove acting as a hook on the edge 10, 11 of the profile.

The groove 11 guided by the corresponding groove in the jointing 5 compels the large side of the L to be placed against the internal face of the conformator.

FIG. 4 shows that when the two shells 4 are assembled, the rim 12 of the small side of the L is firmly engaged against the wall of the conformator by the cornered end 6 of the jointing 5.

Thus, even under vacuum, the two metal profiles 1 are well placed against the walls of the conformator which give them a very precise shape. The seal between the two metal profiles 1 is provided by the ends having a trapezoidal cross-section 6 of the jointing 5 which are elastic but incompressible.

The two jointings 5 have become sealed and the pressure created during foaming also helps to make the two metal profiles 1 match the shape of the conformator very accurately.

It is very obvious that the two metal profiles 1 may be fixed in the shells 4 by other devices apart from grooves 7 and fingers 8. For example, the shells 4 may be provided with suction orifices which draw the metal profiles 1 on the corresponding shells by suction.

In the example described, the two metal profiles 1 have identical shapes but it is quite apparent that composite profiles may be produced from two narrow metal profiles 1 of different shape.

In order to prevent the formation of a zone of weakness, the intervals 3, forming the thermal gaps, are not arranged opposite each other. Each of the intervals 3 will thus be arranged opposite a metal surface and, preferably, at the ends of the composite profile, as shown in FIG. 1.

Figure 5:
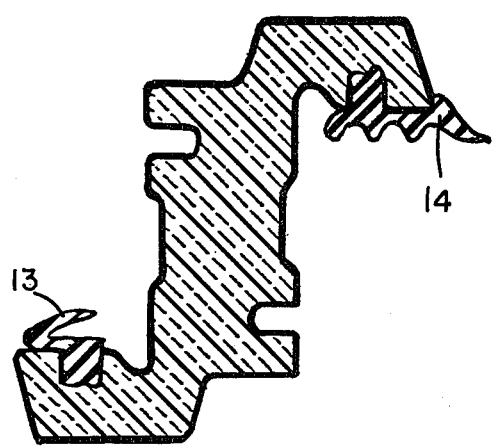
FIG. 5 is a sectional view of the same composite profile in which the seals are inserted.

Finally, it will be noted that each interval 3, forming a thermal gap, forms a furrow between the groove 11 of one profile and the rim 12 of another profile. The plastic of the core 2 only touches the surface of the composite profile at the bottom of the furrow and is thus well protected from any mechanical damage. It is also recommended that each furrow be used for inserting the heels of the shutter catch seals 13 and glazing seals 14, as shown in FIG. 5. Thus, the seals 13, 14 are solidly wedged on the composite profile and at the same time effectively protect the thermal gaps from any mechanical or climatic damage.

I claim:

1. A process for the manufacture of composite profiles of large dimension having a thermal gap, said profiles being composed of two thin metal profiles combined with a foamed plastic core, comprising providing a two piece mold, each piece of said mold having an internal face of generally L-shape in cross section, applying the two thin and flexible metal profiles of generally L-shape in cross section each onto a respective one of said internal faces, each L-shaped profile having a long branch and a short branch with each branch terminating in a free end, said profile being applied with the face end of a long branch of one profile adjacent the face end of a short branch of the other profile and with the free ends of the two profiles being separated by elastomer jointing integral with the shell, pressing the jointings between the corresponding edges of the profile, said jointing having an end base with a groove, and then injecting a foaming material between the two metal profiles at one end of said mold in which the long branch of the L is turned towards the exterior in a direction opposite to the small branch of the L, corresponding to an N-shaped section forming a rib followed by a groove which engages in the end groove in the jointing.

2. A process as claimed in claim 1 in which the metal profiles have a thickness within the range of 0.5 to 1 mm.

3. A process as claimed in claim 2 in which the edge of each metal profile corresponding to the base of the L is applied to the surface of the mold to cause the groove in the metal profile to penetrate the corresponding groove in the jointing integral with the mold.

4. A process as claimed in claim 3 in which the metal profiles have a groove in the large side of the L cooperating with fingers for keeping the profile in position prior to foaming the injected foaming material.

5. A process as claimed in claim 1 in which the metal profiles are formed of an aluminum alloy having a thickness within the range of 0.5 to 1 mm.

6. A process as claimed in claim 1 in which the jointing has a trapezoidal section which engages a groove of corresponding section in the mold surface.

7. A process as claimed in claim 1 in which the foamed material for producing the internal filling results in a foamed plastic having a density of between 80 and 200 kg per $m^2$.

8. A process as claimed in claim 1 in which the profiles are of large dimension and are machined to the desired size for the production of windows of all sizes.

9. A process as claimed in claim 1 in which the jointings are composed of silicone based materials.

* * * * *